(12) United States Patent
Kayahara

(10) Patent No.: US 7,409,110 B2
(45) Date of Patent: Aug. 5, 2008

(54) IMAGE RETRIEVAL SYSTEM, IMAGE RETRIEVAL PROGRAM AND STORAGE MEDIUM AND IMAGE RETRIEVAL METHOD

(75) Inventor: Naoki Kayahara, Nagano (JP)

(73) Assignee: Seiko Epson Corporation (JP)

( * ) Notice: Subject to any disclaimer, the term of this patent is extended or adjusted under 35 U.S.C. 154(b) by 427 days.

(21) Appl. No.: 11/168,056

(22) Filed: Jun. 28, 2005

(65) Prior Publication Data

US 2005/0286806 A1    Dec. 29, 2005

(30) Foreign Application Priority Data

Jun. 29, 2004 (JP) ............... 2004-191365
Feb. 24, 2005 (JP) ............... 2005-048618

(51) Int. Cl.
*G06K 9/54* (2006.01)
*G06K 9/60* (2006.01)

(52) U.S. Cl. ..................................... 382/305
(58) Field of Classification Search ............. 382/305
See application file for complete search history.

(56) References Cited

U.S. PATENT DOCUMENTS

2003/0059121 A1* 3/2003 Savakis et al. ............. 382/239

FOREIGN PATENT DOCUMENTS

| JP | 10-188023 | 7/1998 |
|---|---|---|
| JP | 2003-153007 | 5/2003 |

OTHER PUBLICATIONS

S. Tanaka, et al., "A Study on an Attractiveness Evaluation Model based on the Physical Features of Image Regions", Technical Report of IEICE, PRMU 99-95, pp. 1-8 (1999).

* cited by examiner

*Primary Examiner*—Bhavesh Mehta
*Assistant Examiner*—Jonathan C Schaffer
(74) *Attorney, Agent, or Firm*—Harness, Dickey & Pierce, P.L.C.

(57) ABSTRACT

An image retrieval system including: a retrieval subject image storing unit storing images corresponding to first and second characteristic information among semantic characteristic information, physical characteristic information and prominence characteristic information; a retrieval key inputting unit inputting the first and second characteristic information as the retrieval key; a characteristic information converting unit obtaining remaining characteristic information, the physical characteristic information and the prominence characteristic information based on the two semantic characteristics, the physical characteristic and the prominence characteristic information; and an image retrieval unit retrieving an image matching or being approximate to third characteristic information other than the first and second characteristic information among the semantic characteristic, the physical characteristic and the prominence characteristic information, from the retrieval subject image storing unit by the characteristic information converting unit based on the first and second characteristic information, which are inputted by the retrieval key inputting unit.

6 Claims, 10 Drawing Sheets

IMAGE RETRIEVAL SYSTEM, IMAGE RETRIEVAL PROGRAM AND STORAGE MEDIUM AND IMAGE RETRIEVAL METHOD

RELATED APPLICATIONS

This application claims priority to Japanese Patent Application Nos. 2004-191365 filed Jun. 29, 2004 and 2005-048618 filed Feb. 24, 2005 which are hereby expressly incorporated by reference herein in their entirety.

BACKGROUND OF THE INVENTION

1. Technical Field

The present invention relates to a system, a program and a method for retrieving an image, particularly, an image retrieval system, image retrieval program and storage medium and an image retrieval method, which are capable of satisfying required prominence and preferable to perform layout in accordance with the number and the amount of a layout element.

2. Related Art

In layout operations of a poster, catalog and such, an attractive layout element such as an illustration, a cut, a photograph or an image (referred to as an eye-catching element, hereinafter) are effectively arranged so as to draw attention to a layout result, in many cases.

There is a case, however, that, even when a certain eye-catching element is selected for the purpose of securing prominence expected by a designer, a sufficient area to dispose the eye-catching element cannot be secured in a layout area since there are many layout elements expected to be printed. In such a case, it is required to scale down the eye-catching element to dispose the same or to select another eye-catching element. Contrary to the above, there is also a case that few layout elements expected to be printed cause an area with a blank space to appear even when the eye-catching element is disposed in the layout area. In this case, the eye-catching element is necessary to be enlarged for arrangement or another eye-catching element should be selected. Enlarging or scaling down the eye-catching element is likely to change prominence, and therefore, it is difficult to obtain the prominence expected. On the other hand, in the case of selecting another eye-catching element, it is difficult to properly select another eye-catching element capable of obtaining the prominence equivalent to the expected prominence, and accordingly, the expected prominence is also difficult to be obtained, similarly to the above.

As described above, in layout operations, it is desired to carry out layout in accordance with the number and the amount of a layout element with required prominence being satisfied.

As a technique for supporting layout operations, an image design supporting apparatus disclosed in Japanese Patent Application Publication 10-188023 has been provided, for example.

In an invention disclosed in Japanese Patent Application Publication 10-188023, an image analyzing portion and a collage image forming portion are included in a structure. A designer selects a similar impression image group (images having an impression similar to that of an image to be designed) and a contrast impression image group (images having an impression contrary to that of an image to be designed) among an image registration database (the database is simply abbreviated to DB, hereinafter). When the respective images are selected, the image analyzing portion is used for calculating visual characteristic information of the selected images such as an average of brightness, balance between light and shade, an average of chromaticity, balance between a cold color and a warm color, an average of saturation and the like. Then, the collage image forming portion selects two visual characteristics, which have a large difference in the average value of the visual characteristic information between the similar impression image group and the contrast impression image group. The respective images in the similar impression image group and the contrast impression image group are displayed in a display portion as a two-dimensional graph.

This gives a general designer, who has no designing knowledge, a clear and detailed guide to design an image. A general designer can thus design a whole image so as to make an impression of effectively conveying his or her intentions.

As a technique of performing image processing in accordance with the prominence of an image, an image compression method disclosed in Japanese Patent Application Publication 2003-153007 has been provided, for example.

In the invention disclosed in Japanese Patent Application Publication 2003-153007, an image in a cluster is graded on the basis of the importance of prominence of an image so as to automatically change the compression of the image. In a grading process, one or more amounts related to each image and one or more characteristics of contents of the image are calculated. The one or more characteristics include contents of the image. In the invention disclosed in Japanese Patent Application Publication 2003-153007, a reasoning algorithm practiced on the basis of an opinion of one or more observers is used for processing the above-mentioned amount to apply the amount to the image for the purpose of grading. The image is then variably compressed on the basis of the grading. A compression amount of a low grade image is more than that of a high grade image.

Japanese Patent Application Publication 10-188023 is an example of related art.

Japanese Patent Application Publication 2003-153007 is another example of the related art.

In the invention disclosed in Japanese Patent Application Publication 10-188023, it is arrange so that two visual characteristics, which have a large difference in the average value of the visual characteristic information between the similar impression image group and the contrast impression image group, are selected to display respective images in the similar impression image group and the contrast impression image group. Accordingly, even a general designer having no designing knowledge can easily select or collect images close to his or her own image, or contrary to the above, images opposite to his or her own image.

In the case, however, that a sufficient area to dispose the eye-catching element cannot be secured or that there is still an area with a blank space even with the eye-catching element disposed, the invention disclosed in Japanese Patent Application Publication 10-188023 cannot support the designer in obtaining the prominence expected by the designer. Therefore, there is a problem that layout is difficult to be carried out in accordance with the number and the amount of layout elements with the required prominence being satisfied.

The invention disclosed in Japanese Patent Application Publication 2003-153007 is a technique of grading an image in a cluster on the basis of prominence of the image so as to compress the image. The technical field and technical problems thereof are different from those concerning the layout of an image, and therefore, the problems described in the above paragraphs cannot be solved at all.

SUMMARY

An advantage of the present invention is to provide an image retrieval system, an image retrieval program and storage medium and an image retrieval method, which are capable of satisfying required prominence and preferable to perform layout in accordance with the number and the amount of layout elements.

Inventors of the invention diligently studied and directed their attention to an experience law that a figure image is greater in prominence than a landscape image and a face image is greater in prominence than a figure image when a size of the images is the same while a large image is superior in prominence to a small image when the contents of the images are the same. This results in finding that there is a specific dependence relation among prominence, size and contents of an image. The inventors thus reached a conclusion that using such a dependence relation allowed an image different in contents and size to be selected with the prominence thereof being maintained, an image different in prominence and contents to be selected with a size thereof being maintained and an image different in prominence and size to be selected with then contents thereof being maintained.

Mode 1. An image retrieval system in accordance with a first aspect of the invention is an image retrieval system for retrieving an image corresponding to a retrieval key among plural images subject to retrieval on the basis of the retrieval key, the image retrieval system comprising:

a retrieval subject image storing unit that stores the images subject to retrieval so that the respective images would correspond to first characteristic information and second characteristic information among semantic characteristic information of an image, physical characteristic information of an image and prominence characteristic information showing prominence of an image;

a retrieval key inputting unit that inputs the first characteristic information and the second characteristic information as the retrieval key;

a characteristic information converting unit that obtains the rest of the characteristic information other than any two of the semantic characteristic information, the physical characteristic information and the prominence characteristic information on the basis of the two of the semantic characteristic information, the physical characteristic information and the prominence characteristic information; and an image retrieval unit that retrieves an image subject to retrieval, the image matching or being approximate to third characteristic information other than the first characteristic information and the second characteristic information among the semantic characteristic information, the physical characteristic information and the prominence characteristic information, from the retrieval subject image storing unit by the characteristic information converting unit on the basis of the first characteristic information and the second characteristic information, which are inputted by the retrieval key inputting unit.

In such a structure, when the first characteristic information and the second characteristic information are inputted as the retrieval key by the retrieval key inputting unit, the image retrieval unit retrieves an image subject to retrieval, the image matching or being approximate to the third characteristic information, from the retrieval subject image storing unit by the characteristic information converting unit on the basis of the inputted first characteristic information and second characteristic information. That is to say, the third characteristic information can be obtained by the characteristic information converting unit on the basis of the inputted first characteristic information and second characteristic information, so that an image subject to retrieval, the image matching or being approximate to the obtained third characteristic information, is retrieved from the retrieval subject image storing unit.

This allows an image different in first characteristic information or second characteristic information from that of a certain image to be obtained with the third characteristic information of the certain image being maintained when the first characteristic information and the second characteristic information of the certain image are inputted as the retrieval key. It is possible, for example, to select an image different in contents or size from that of a second image with the prominence of the second image being maintained, to select an image different in prominence or contents from that of a second image with a size of the second image being maintained or to select an image different in prominence or size from that of a second image with the contents of the second image being maintained. Accordingly, an effect can be obtained such that layout is more easily performed than the conventional case in accordance with the number or the amount of layout elements while required prominence is satisfied.

In the above structure, the image retrieval unit may be in any arrangement as long as it retrieves an image subject to retrieval by a characteristic information converting unit. At lease the following two types of arrangement are considered, for example. In the first type of arrangement, the third characteristic information is obtained by the characteristic information converting unit on the basis of the first characteristic information and second characteristic information inputted by the retrieval key inputting unit, ranges of the first characteristic information and the second characteristic information are determined by the characteristic information converting unit on the basis of the obtained third characteristic information and an image subject to retrieval, and the image belonging to or being approximate to the determined ranges of the first characteristic information and the second characteristic information, is retrieved. In the second type of arrangement, the third characteristic information is obtained by the characteristic information converting unit on the basis of the first characteristic information and second characteristic information inputted by the retrieval key inputting unit, the third characteristic information for respective images subject to retrieval is obtained on the basis of the first characteristic information and the second characteristic information, which correspond to the respective images subject to retrieval, and an image subject to retrieval, the image corresponding to the third characteristic information matching and being approximate to the third characteristic information obtained on the basis of the retrieval key, is retrieved.

Further, the characteristic information converting unit may be in any arrangement as long as, on the basis of two pieces of characteristic information, the rest of the characteristic information is obtained. It is possible, for example, to be based on the characteristic information converting dictionary defining a corresponding relation among the semantic characteristic information, the physical characteristic information and the prominence characteristic information. It is also possible to be based on a relational expression defining a corresponding relation between the semantic characteristic information, the physical characteristic information and the prominence characteristic information.

The first characteristic information is any one of the semantic characteristic information, the physical characteristic information and the prominence characteristic information. The second characteristic information is any one of the semantic characteristic information, the physical characteristic information and the prominence characteristic information other than the first characteristic information. The third characteristic information is any one of the semantic characteristic information, the physical characteristic information and the prominence characteristic information other than the first characteristic information and the second characteristic information. This is the same in the following image retrieval program in Mode 6, storage medium in Mode 11 and image retrieval methods in Modes 16 and 17.

The semantic characteristic information may be formed from a one-dimensional element or a multi-dimensional element. This is true of the physical characteristic information and the prominence characteristic information. The above is the same in the following image retrieval program in Mode 6, storage medium in Mode 11 and image retrieval methods in Modes 16 and 17.

The retrieval subject image storing unit is for storing an image subject to retrieval by any means at any time. It may store an image subject to retrieval in advance or store an image subject to retrieval by an input from the outside or the like in operating the system without storing the image subject to retrieval in advance. This is true of a case of storing the semantic characteristic information, the physical characteristic information or the prominence characteristic information in the retrieval subject image storing unit.

The system may be arranged to be a single apparatus, terminal or other devices or to be a network system in which plural apparatuses, terminals and other devices are connected so as to be able to communicate each other. In the latter case, respective components may belong to any one of the plural devices and the like as long as they are respectively connected so as to be capable of communication.

Mode 2. An image retrieval system in accordance with a second aspect of the invention is the image retrieval system according to the first aspect of the invention, comprising:

a characteristic information converting dictionary storing unit that stores a characteristic information converting dictionary defining a corresponding relation between the semantic characteristic information, the physical characteristic information and the prominence characteristic information, wherein the characteristic information converting unit retrieves the rest of the characteristic information from the characteristic information converting dictionary on the basis of the given two pieces of characteristic information.

In such a structure, the characteristic information converting unit retrieves, on the basis of the two pieces of given characteristic information, the rest of the characteristic information from the characteristic information converting dictionary.

A corresponding relation between the semantic characteristic information, the physical characteristic information and the prominence characteristic information is considered to be difficult to be defined by a relational expression since there is an element dependent to human subjectiveness. Accordingly, the above structure can achieve an effect such that, on the basis of the two pieces of given characteristic information, the rest characteristic information can be relatively more properly obtained than the case of using a relational expression.

In the above structure, the characteristic information converting dictionary storing unit is for storing the characteristic information converting dictionary by any means at any time. It may store the characteristic information converting dictionary in advance or store the characteristic information converting dictionary by an input from the outside or the like in operating the system without storing the characteristic information converting dictionary in advance.

Mode 3. An image retrieval system in accordance with a third aspect of the invention is the image retrieval system according to any one of the first and second aspects of the invention, comprising:

a second retrieval key inputting unit that inputs the first characteristic information or the second characteristic information as the second of the retrieval key, wherein the image retrieval unit is arrange so that: the third characteristic information is obtained by the characteristic information converting unit on the basis of the first characteristic information and the second characteristic information, which are inputted by the retrieval key inputting unit; the first characteristic information and the second characteristic information are obtained by the characteristic information converting unit on the basis of the obtained third characteristic information and the first characteristic information and the second characteristic information, which are inputted by the second retrieval key inputting unit; and an image subject to retrieval, the image matching or being approximate to the obtained second characteristic information or first characteristic information and the first characteristic information or the second characteristic information, which is inputted by the second retrieval key inputting unit, is retrieved from the retrieval subject image storing unit.

In such a structure, when the first characteristic information or the second characteristic information is inputted as the second retrieval key by the second retrieval key inputting unit, the image retrieval unit is arranged so that the third characteristic information is obtained by the characteristic information converting unit on the basis of the first characteristic information and second characteristic information inputted by the retrieval key inputting unit and that the second characteristic information or first characteristic information is obtained by the characteristic information converting unit on the basis of the obtained third characteristic information and the first characteristic information or second characteristic information inputted by the second retrieval key inputting unit. Then, an image subject to retrieval, the image matching or being approximate to the obtained second characteristic information or the first characteristic information and the first characteristic information or second characteristic information inputted by the second retrieval key inputting unit, is retrieved from the retrieval subject image storing unit.

This leads to an effect such that inputting the first characteristic information and the second characteristic information of a certain image as the retrieval key and inputting changed values of the inputted first characteristic information or the second characteristic information as the second retrieval key allow an image matching or being approximate to the changed first characteristic information or second characteristic information to be obtained with the third characteristic information of the certain image being maintained.

Mode 4. An image retrieval system in accordance with a fourth aspect of the invention is the image retrieval system according to any one of the first to third aspects of the invention, wherein the first characteristic information and the second characteristic information are the semantic characteristic information and the physical characteristic information, and the third characteristic information is the prominence characteristic information.

In such a structure, when the semantic characteristic information and the physical characteristic information are inputted as the retrieval key by the retrieval key inputting unit, the image retrieval unit retrieves an image subject to retrieval, the image matching or being approximate to the prominence characteristic information, from the retrieval subject image storing unit by the characteristic information converting unit on the basis of the inputted semantic characteristic information and physical characteristic information. That is to say, the prominence characteristic information can be obtained by the characteristic information converting unit on the basis of the inputted semantic characteristic information and physical characteristic information, so that an image subject to retrieval, the image matching or being approximate to the obtained prominence characteristic information, is retrieved from the retrieval subject image storing unit.

This leads an effect such that inputting the semantic characteristic information and the physical characteristic information of a certain image as the retrieval key allows an image different in semantic characteristic information or physical characteristic information from that of the certain image to be obtained with the prominence characteristic information of the certain image being maintained.

Mode 5. An image retrieval system in accordance with a fifth aspect of the invention is the image retrieval system according to any one of the first to fourth aspects of the invention, wherein the semantic characteristic information is information relating to a categorical attribute given in accordance with the contents of an image and the physical characteristic information is information relating to a size of an image or the arrangement of colors in an image.

In such a structure, it is possible to select an image different in categorical attribute, size or arrangement of colors with the prominence of the image being maintained, to select an image different in prominence or categorical attribute with the size and the arrangement of colors of the image being maintained or to select an image different in prominence, size or arrangement of colors with the categorical attribute of the image being maintained.

Mode 6. An image retrieval program in accordance with a sixth aspect of the invention is an image retrieval program for retrieving an image corresponding to a retrieval key among plural images subject to retrieval on the basis of the retrieval key, the image retrieval program being a program causing a computer to execute a process comprising:

a retrieval key inputting step for inputting as the retrieval key first characteristic information and second characteristic information among semantic characteristic information of an image, physical characteristic information of an image and prominence characteristic information showing prominence of an image;

a characteristic information converting step for obtaining the rest of the characteristic information other than any two of the semantic characteristic information, the physical characteristic information and the prominence characteristic information on the basis of the two of the semantic characteristic information, the physical characteristic information and the prominence characteristic information; and an image retrieval step for carrying out the characteristic information converting step on the basis of the first characteristic information and the second characteristic information, which are inputted in the retrieval key inputting step, to retrieve an image subject to retrieval, the image matching or being approximate to third characteristic information other than the first characteristic information and the second characteristic information among the semantic characteristic information, the physical characteristic information and the prominence characteristic information, from a retrieval subject image storing unit stored with the respective images subject to retrieval, the image corresponding to the first characteristic information and the second characteristic information.

In such a structure, a program is read by a computer and the computer executes a process in accordance with the read program, so that an operation and an effect equivalent to those of the image retrieval system in Mode 1 can be obtained.

In the above structure, the image retrieval step may be in any mode as long as the characteristic information converting step is performed to retrieve an image subject to retrieval. At least the following two modes are considered, for example. In the first mode, the third characteristic information is obtained by the characteristic information converting step on the basis of the first characteristic information and second characteristic information inputted by the retrieval key inputting step, ranges of the first characteristic information and the second characteristic information are determined by the characteristic information converting step on the basis of the obtained third characteristic information and an image subject to retrieval, the image belonging to or being approximate to the determined ranges of the first characteristic information and the second characteristic information, is retrieved. In the second mode, the third characteristic information is obtained by the characteristic information converting step on the basis of the first characteristic information and second characteristic information inputted by the retrieval key inputting step, the third characteristic information for respective images subject to retrieval is obtained on the basis of the first characteristic information and the second characteristic information, which correspond to the respective images subject to retrieval and an image subject to retrieval, the image corresponding to the third characteristic information matching and being approximate to the third characteristic information obtained on the basis of the retrieval key, is retrieved. This is the same in the following storage medium in Mode 11 and image retrieval methods in Modes 16 and 17.

The characteristic information converting step may be in any mode as long as, on the basis of two pieces of characteristic information, the rest of the characteristic information is obtained. It is possible, for example, to be based on the characteristic information converting dictionary defining a corresponding relation between the semantic characteristic information, the physical characteristic information and the prominence characteristic information. It is also possible to be based on a relational expression defining a corresponding relation between the semantic characteristic information, the physical characteristic information and the prominence characteristic information. This is the same in the following storage medium in Mode 11 and image retrieval methods in Modes 16 and 17.

Mode 7. An image retrieval program in accordance with a seventh aspect of the invention is the image retrieval program according to the sixth aspect of the invention, wherein the characteristic information converting step is for retrieving on the basis of the given two pieces of characteristic information the rest of the characteristic information from a characteristic information converting dictionary defining a corresponding relation between the semantic characteristic information, the physical characteristic information and the prominence characteristic information.

In such a structure, a program is read by a computer and the computer executes a process in accordance with the read program, so that an operation and an effect equivalent to those of the image retrieval system in Mode 2 can be obtained.

Mode 8. An image retrieval program in accordance with an eighth aspect of the invention is the image retrieval program according to any one of the sixth and seventh aspects of the invention, comprising:

a program for causing a computer to execute a process comprising a second retrieval key inputting step for inputting the first characteristic information and the second characteristic information as the second retrieval key, wherein the image retrieval step is arrange so that: the third characteristic information is obtained in the characteristic information converting step on the basis of the first characteristic information and the second characteristic information, which are inputted in the retrieval key inputting step; the second characteristic information or the first characteristic information is obtained in the characteristic information converting step on the basis of the obtained third characteristic information and the first characteristic information or the second characteristic information, which is inputted in the second retrieval key inputting step; and an image subject to retrieval, the image matching or being approximate to the obtained second characteristic information or the first characteristic information and the first characteristic information or the second characteristic information, which are inputted in the second retrieval key inputting step, is retrieved from the retrieval subject image storing unit.

In such a structure, a program is read by a computer and the computer executes a process in accordance with the read program, so that an operation and an effect equivalent to those of the image retrieval system in Mode 3 can be obtained.

Mode 9. An image retrieval program in accordance with a ninth aspect of the invention is the image retrieval program according to any one of the sixth to eighth aspects of the invention, wherein the first characteristic information and the second characteristic information are the semantic characteristic information and the physical characteristic information, and the third characteristic information is the prominence characteristic information.

In such a structure, a program is read by a computer and the computer executes a process in accordance with the read program, so that an operation and an effect equivalent to those of the image retrieval system in Mode 4 can be obtained.

Mode 10. An image retrieval program in accordance with a tenth aspect of the invention is the image retrieval program according to any one of the sixth to ninth aspects of the invention, wherein the semantic characteristic information is information relating to a categorical attribute given in accordance with the contents of an image, and the physical characteristic information is information relating to a size of an image or the arrangement of colors in an image.

In such a structure, a program is read by a computer and the computer executes a process in accordance with the read program, so that an operation and an effect equivalent to those of the image retrieval system in Mode 5 can be obtained.

Mode 11. A storage medium in accordance with an eleventh aspect of the invention is a storage medium capable of reading by a computer and stored with an image retrieval program for retrieving an image corresponding to a retrieval key among plural images subject to retrieval on the basis of the retrieval key, the storage medium being stored with a program causing a computer to execute a process comprising:

a retrieval key inputting step for inputting as the retrieval key first characteristic information and second characteristic information among semantic characteristic information of an image, physical characteristic information of an image and prominence characteristic information showing prominence of an image;

a characteristic information converting step for obtaining the rest of the characteristic information other than any two of the semantic characteristic information, the physical characteristic information and the prominence characteristic information on the basis of the two of the semantic characteristic information, the physical characteristic information and the prominence characteristic information; and an image retrieval step for carrying out the characteristic information converting step on the basis of the first characteristic information and the second characteristic information, which are inputted in the retrieval key inputting step, to retrieve an image subject to retrieval, the image matching or being approximate to third characteristic information other than the first characteristic information and the second characteristic information among the semantic characteristic information, the physical characteristic information and the prominence characteristic information, from a retrieval subject image storing unit stored with the respective images subject to retrieval, the images corresponding to the first characteristic information and the second characteristic information.

In such a structure, a program is read by a computer from a storage medium and the computer executes a process in accordance with the read program, so that an operation and an effect equivalent to those of the image retrieval system in Mode 1 can be obtained.

Mode 12. A storage medium in accordance with a twelfth aspect of the invention is the storage medium according to the eleventh aspect of the invention, wherein the characteristic information converting step retrieves on the basis of the given two pieces of characteristic information the rest of the characteristic information from the characteristic information converting dictionary defining a corresponding relation between the semantic characteristic information, the physical characteristic information and the prominence characteristic information.

In such a structure, a program is read by a computer from the storage medium and the computer executes a process in accordance with the read program, so that an operation and an effect equivalent to those of the image retrieval system in Mode 2 can be obtained.

Mode 13. A storage medium in accordance with a thirteenth aspect of the invention is the storage medium according to any one of the eleventh and twelfth aspects of the invention, stored with a program for causing a computer to execute a process comprising a second retrieval key inputting step for inputting the first characteristic information and the second characteristic information as the second retrieval key, wherein the image retrieval step is arrange so that: the third characteristic information is obtained in the characteristic information converting step on the basis of the first characteristic information and the second characteristic information, which are inputted in the retrieval key inputting step; the second characteristic information or the first characteristic information is obtained in the characteristic information converting step on the basis of the obtained third characteristic information and the first characteristic information or the second characteristic information, which is inputted in the second retrieval key inputting unit; and an image subject to retrieval, the image matching or being approximate to the obtained second characteristic information or the first characteristic information and the first characteristic information and the second characteristic information, which are inputted in the second retrieval key inputting unit, is retrieved from the retrieval subject image storing unit.

In such a structure, a program is read by a computer from a storage medium and the computer executes a process in accordance with the read program, so that an operation and an effect equivalent to those of the image retrieval system in Mode 3 can be obtained.

Mode 14. A storage medium in accordance with a fourteenth aspect of the invention is the storage medium according to any one of the eleventh to thirteenth aspects of the invention, wherein the first characteristic information and the second characteristic information are the semantic characteristic information and the physical characteristic information and the third characteristic information is the prominence characteristic information.

In such a structure, a program is read by a computer from a storage medium and the computer executes a process in accordance with the read program, so that an operation and an effect equivalent to those of the image retrieval system in Mode 4 can be obtained.

Mode 15. A storage medium in accordance with a fifteenth aspect of the invention is the storage medium according to any one of the eleventh to fourteenth aspects of the invention, wherein the semantic characteristic information is information relating to a categorical attribute given in accordance with the contents of an image and the physical characteristic information is information relating to a size of an image or the arrangement of colors in an image.

In such a structure, a program is read by a computer from a storage medium and the computer executes a process in accordance with the read program, so that an operation and an effect equivalent to those of the image retrieval system in Mode 5 can be obtained.

Mode 16. An image retrieval method in accordance with a sixteenth aspect of the invention is an image retrieval method for retrieving an image corresponding to a retrieval key among plural images subject to retrieval on the basis of the retrieval key, comprising:

a retrieval key inputting step for inputting as the retrieval key first characteristic information and second characteristic information among semantic characteristic information of an image, physical characteristic information of an image and prominence characteristic information showing prominence of an image;

a characteristic information converting step for obtaining the rest of the characteristic information other than any two of the semantic characteristic information, the physical characteristic information and the prominence characteristic information on the basis of the two of the semantic characteristic information, the physical characteristic information and the prominence characteristic information; and an image retrieval step for carrying out the characteristic information converting step on the basis of the first characteristic information and the second characteristic information, which are inputted in the retrieval key inputting step, to retrieve an image subject to retrieval, the image matching or being approximate to third characteristic information other than the first characteristic information and the second characteristic information among the semantic characteristic information, the physical characteristic information and the prominence characteristic information, from a retrieval subject image storing unit stored with the respective images subject to retrieval, the images corresponding to the first characteristic information and the second characteristic information.

This allows an effect equivalent to that of the image retrieval system in Mode 1 to be obtained.

Mode 17. An image retrieval method in accordance with a seventeenth aspect of the invention is an image retrieval method for retrieving an image corresponding to a retrieval key among plural images subject to retrieval on the basis of the retrieval key, comprising:

a retrieval key inputting step in which an inputting unit inputs as the retrieval key first characteristic information and second characteristic information among semantic characteristic information of an image, physical characteristic information of an image and prominence characteristic information showing prominence of an image;

a characteristic information converting step in which an arithmetic unit obtains the rest of the characteristic information other than any two of the semantic characteristic information, the physical characteristic information and the prominence characteristic information on the basis of the two of the semantic characteristic information, the physical characteristic information and the prominence characteristic information; and an image retrieval step in which the arithmetic unit carries out the characteristic information converting step on the basis of the first characteristic information and the second characteristic information, which are inputted in the retrieval key inputting step, to retrieve an image subject to retrieval, the image matching or being approximate to third characteristic information other than the first characteristic information and the second characteristic information among the semantic characteristic information, the physical characteristic information and the prominence characteristic information, from a retrieval subject image storing unit stored with the respective images subject to retrieval, the images corresponding to the first characteristic information and the second characteristic information.

This allows an effect equivalent to that of the image retrieval system in Mode 1 to be obtained.

Mode 18. An image retrieval method in accordance with an eighteenth aspect of the invention is the image retrieval method according to any one of the sixteenth and seventeenth aspects of the invention, wherein the characteristic information converting step is for retrieving on the basis of the given two pieces of characteristic information the rest of the characteristic information from a characteristic information converting dictionary defining a corresponding relation between the semantic characteristic information, the physical characteristic information and the prominence characteristic information.

This allows an effect equivalent to that of the image retrieval system in Mode 2 to be obtained.

Mode 19. An image retrieval method in accordance with a nineteenth aspect of the invention is the image retrieval method according to any one of the sixteenth to eighteenth aspects of the invention, comprising:

a second retrieval key inputting step for inputting the first characteristic information or the second characteristic information as the second of the retrieval key, wherein the image retrieval step is arrange so that: the third characteristic information is obtained in the characteristic information converting step on the basis of the first characteristic information and the second characteristic information, which are inputted in the retrieval key inputting step; the second characteristic information or the first characteristic information are obtained in the characteristic information converting step on the basis of the obtained third characteristic information and the first characteristic information or the second characteristic information, which is inputted in the second retrieval key inputting step; and an image subject to retrieval, the image matching or being approximate to the obtained second characteristic information or the first characteristic information and the first characteristic information or the second characteristic information, which are inputted in the second retrieval key inputting step, is retrieved from the retrieval subject image storing unit.

This allows an effect equivalent to that of the image retrieval system in Mode 3 to be obtained.

Mode 20. An image retrieval method in accordance with a twentieth aspect of the invention is the image retrieval method according to any one of the sixteenth to nineteenth aspects of the invention, wherein the first characteristic information and the second characteristic information are the semantic characteristic information and the physical characteristic information and the third characteristic information is the prominence characteristic information.

This allows an effect equivalent to that of the image retrieval system in Mode 4 to be obtained.

Mode 21. An image retrieval method in accordance with a twenty-first aspect of the invention is the image retrieval method according to any one of the sixteenth to twentieth aspects of the invention, wherein the semantic characteristic information is information relating to a categorical attribute given in accordance with the contents of an image and the physical characteristic information is information relating to a size of an image or the arrangement of colors in an image.

This allows an effect equivalent to that of the image retrieval system in Mode 5 to be obtained.

BRIEF DESCRIPTION OF THE DRAWINGS

The invention will be described with reference to the accompanying drawings, wherein like numbers reference like elements, and wherein.

DESCRIPTION OF THE EMBODIMENTS

Embodiments of the invention will be described hereinafter with reference to drawings. FIGS. 1 to 9 show an image retrieval system, image retrieval program and storage medium and an image retrieval method in an embodiment of the invention.

In the embodiment, an image retrieval system, image retrieval program and storage medium and an image retrieval method in accordance with the invention are applied to a case that, in layout operations in which a layout element such as an image and a text is arranged in a predetermined layout area, an image arranged in the layout area is changed to another image different in contents and size with the prominence thereof being maintained.

First, an outline of functions of a layout apparatus 100 to which the invention is applied will be described with reference to FIG. 1.

Figure 1:
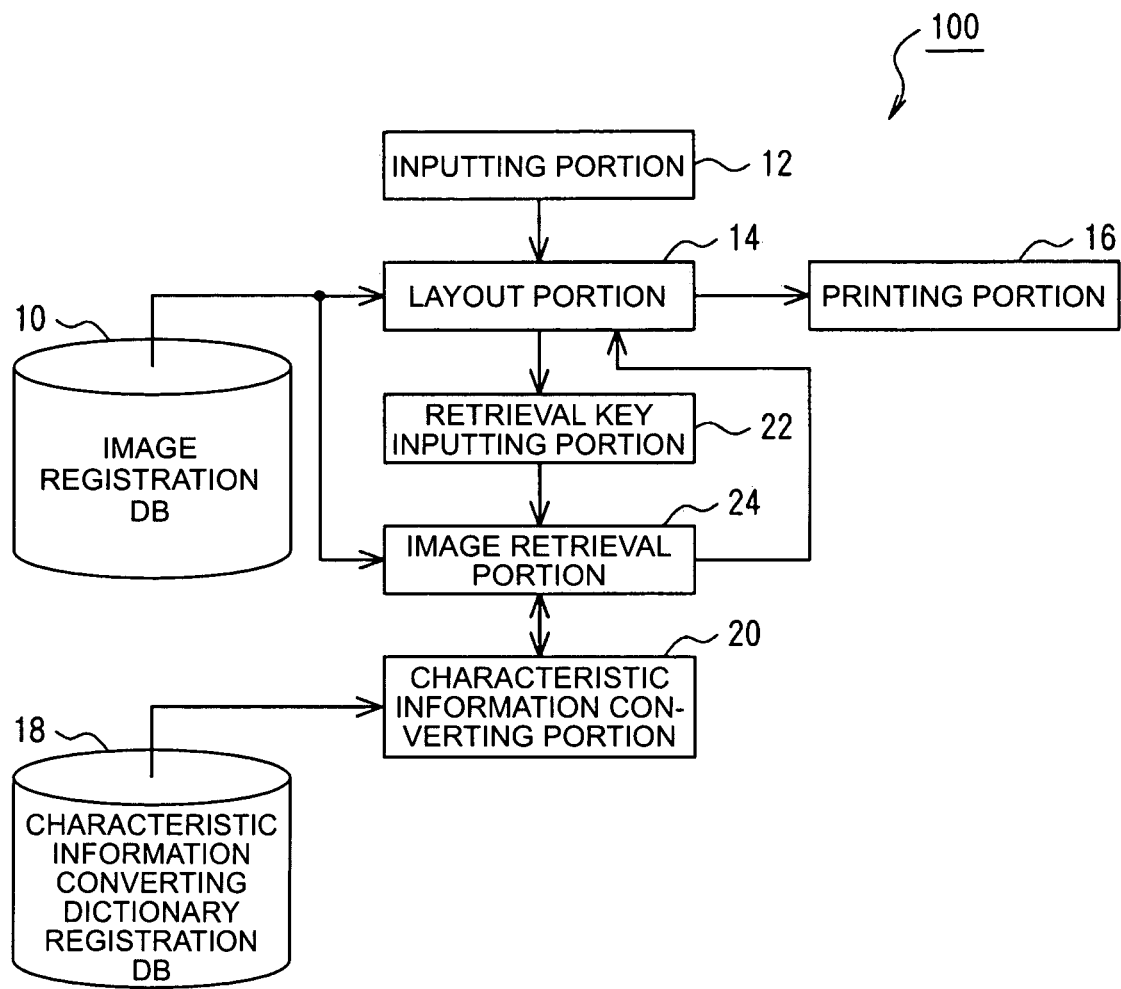
FIG. 1 is a block diagram showing an outline of functions of a layout apparatus 100.

FIG. 1 is a block diagram showing an outline of functions of the layout apparatus 100.

As shown in FIG. 1, the layout apparatus 100 comprises an image registration DB 10 in which an image to be an eye-catching element is registered so as to correspond to a categorical attribute and a size, an imputing portion 12 for inputting an operation or instructions relating to a layout, a layout portion 14 for arranging an image in the image registration DB 10 or another layout element in the layout area on the basis of an input from the inputting portion 12 and a printing portion 16 for printing a layout result in the layout portion 14.

The layout apparatus 100 further comprises a characteristic information converting dictionary registration DB 18 in which a characteristic information converting dictionary is registered, the characteristic information converting dictionary defining a corresponding relation between a categorical attribute of an image, a size of an image and prominence characteristic information showing degree of prominence of an image, a characteristic information converting portion 20 for converting a categorical attribute, a size and prominence characteristic information each other by the characteristic information converting dictionary, a retrieval key inputting portion 22 for inputting as a retrieval key a categorical attribute and a size of an image, which relate to requirements of change from the layout portion 14, and a size after the change and an image retrieval portion 24 for retrieving an image from the image registration DB 10 on the basis of the retrieval key inputted in the retrieval key inputting portion 22.

When any two pieces of characteristic information among the categorical attribute, the size and the prominence characteristic information are given, the characteristic information converting portion 20 retrieves the rest of the characteristic information from the characteristic information converting dictionary on the basis of the two pieces of given characteristic information.

The image retrieval portion 24 obtains prominence characteristic information by characteristic information converting portion 20 on the basis of the categorical attribute and size inputted by the retrieval key inputting portion 22. The image retrieval portion 24 then obtains a categorical attribute by the characteristic information converting portion 20 on the basis of the obtained prominence characteristic information and the size after a change, the size being inputted by the retrieval key inputting portion 22, to retrieve an image, which matches with or approximates to the obtained categorical attribute and the inputted size after a change, from the image registration DB 10.

Next, a structure of the layout apparatus 100 will be described with reference to FIGS. 2 to 6.

Figure 2:
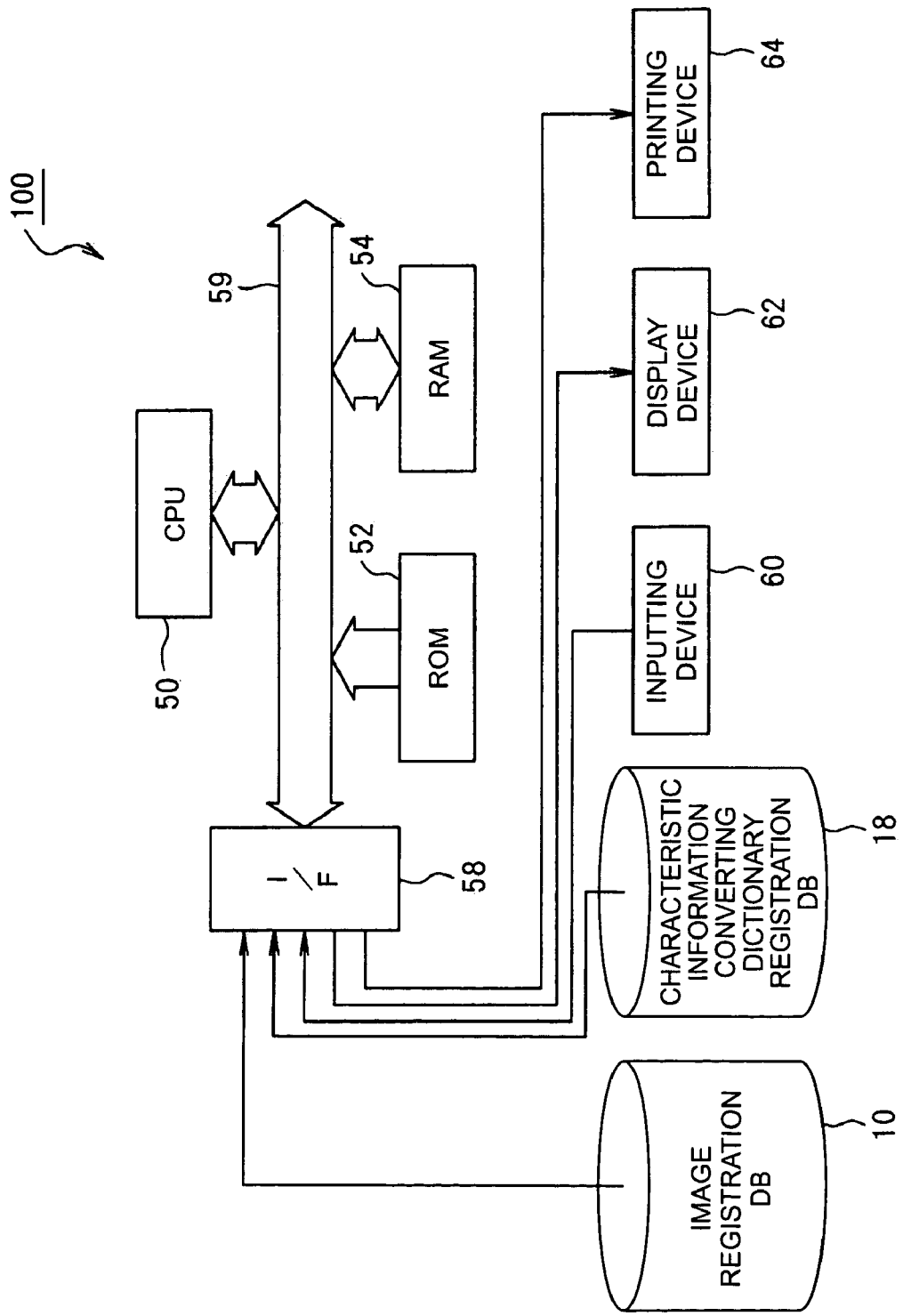
FIG. 2 is a block diagram showing a structure of hardware of the layout apparatus 100.

FIG. 2 is a block diagram showing a structure of hardware of the layout apparatus 100.

As shown in FIG. 2, the layout apparatus 100 comprises a CPU 50 for controlling an operation and a whole system on the basis of a controlling program, a ROM 52 stored with the controlling program of the CPU 50 and such in a predetermined area in advance, a RAM 54 for storing data read from the ROM 52 or the like and operation results required in an operation process of the CPU 50 and an I/F 58 for mediating input and output of data to an external device. The above components are connected with each other by a bus 59, which is a signal line for transferring data, so as to be able to give and receive data.

To the I/F 58, connected as external devices are the image registration DB 10, the characteristic information converting dictionary registration DB 18, an inputting device 60 formed from a keyboard, a mouse or the like, which is capable of inputting data as a human interface, a display device 62 for displaying a screen on the basis of an image signal and a printing device 64 for carrying out printing on the basis of printing data.

Next, a data structure of the image registration DB 10 will be described in detail with reference to FIG. 3.

In the image registration DB 10, registered are plural images to be an eye-catching element and an image characteristic information registration table 400 in which a categorical attribute and a size of the respective images are registered.

Figure 3:
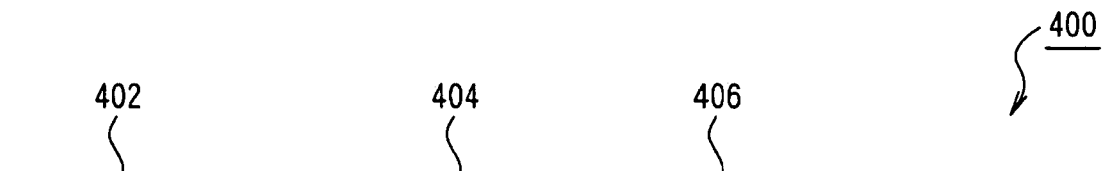
FIG. 3 illustrates a data structure of an image characteristic information registration table 400.

FIG. 3 illustrates a data structure of image characteristic information registration table 400.

In the image characteristic information registration table 400, one record is registered for every image, as shown in FIG. 3. Each record comprises a field 402 in which a file name of an image is registered, a field 404 in which a categorical attribute of an image is registered and a field 406 in which a size of an image is registered. As the categorical attribute, any one of "face", "figure", "animal" and "landscape" is registered, for example.

In the example of FIG. 3, in the first column record "image01.jpg" is registered as the file name, "face" is registered as the categorical attribute and "40 (200×200)" is registered as the size, respectively. This means that an image under the file name of "image01.jpg" is a face image showing a human face and 40 kpixel in size.

A data structure of the characteristic information converting dictionary registration DB 18 will be described in detail with reference to FIGS. 4 and 5.

In the characteristic information converting dictionary registration DB 18, the characteristic information converting dictionary defining a corresponding relation between a categorical attribute, a size and prominence characteristic information is registered. In the characteristic information converting dictionary, information is stored into which two-dimensional image characteristic information space is sectioned in accordance with a categorical attribute. The two-dimensional image characteristic information space is formed by allocating the size and the prominence characteristic information respectively to the Y axis and the X axis on the basis of a result of evaluation of change in prominence characteristic information in accordance with change in categorical attribute and size in sensitivity evaluation experimentation.

A process of the sensitivity evaluation experimentation will be simply described. The sensitivity evaluation experimentation in the embodiment is an example for obtaining a scale of a space between the categorical attributes. It is possible to use an evaluation result obtained from other sensitivity evaluation experimentation.

(1) Preparing plural images with categorical attributes.

In the embodiment, for the purpose of simplifying description, the categorical attribute is of four kinds of "face", "figure", "animal" and "landscape". Plural images with the categorical attributes (around 100 images for each kind) are prepared as an image subject to evaluation.

(2) As an evaluation method, the method of paired comparisons is adopted in which two images selected at random among the plural images subject to evaluation and changed in size at random are shown to subjects (around 40 subjects) so that the subjects would select an image attracting their attention more. It is possible to ask the subjects which image of the two shown images is first looked, but using an eye-camera for observing movement of their eyes so as to leave little room for subjective judgment allows more objective evaluation result to be obtained.

(3) Summing up the number of selections for respective combinations of a categorical attribute and a size to calculate a probability value of easy attention as the prominence characteristic information on the basis of a summing-up result.

An image with a categorical attribute of "face" is selected many times since it draws attention more easily than an image with another categorical attribute although there is a little variation. This results in increase in prominence characteristic information of the former image. Contrary to the above, an image with a categorical attribute of "landscape" attracts less attention than an image with another categorical attribute, so that the number of selections of the former image is small. This results in small prominent characteristic information of the former image.

Figure 4:
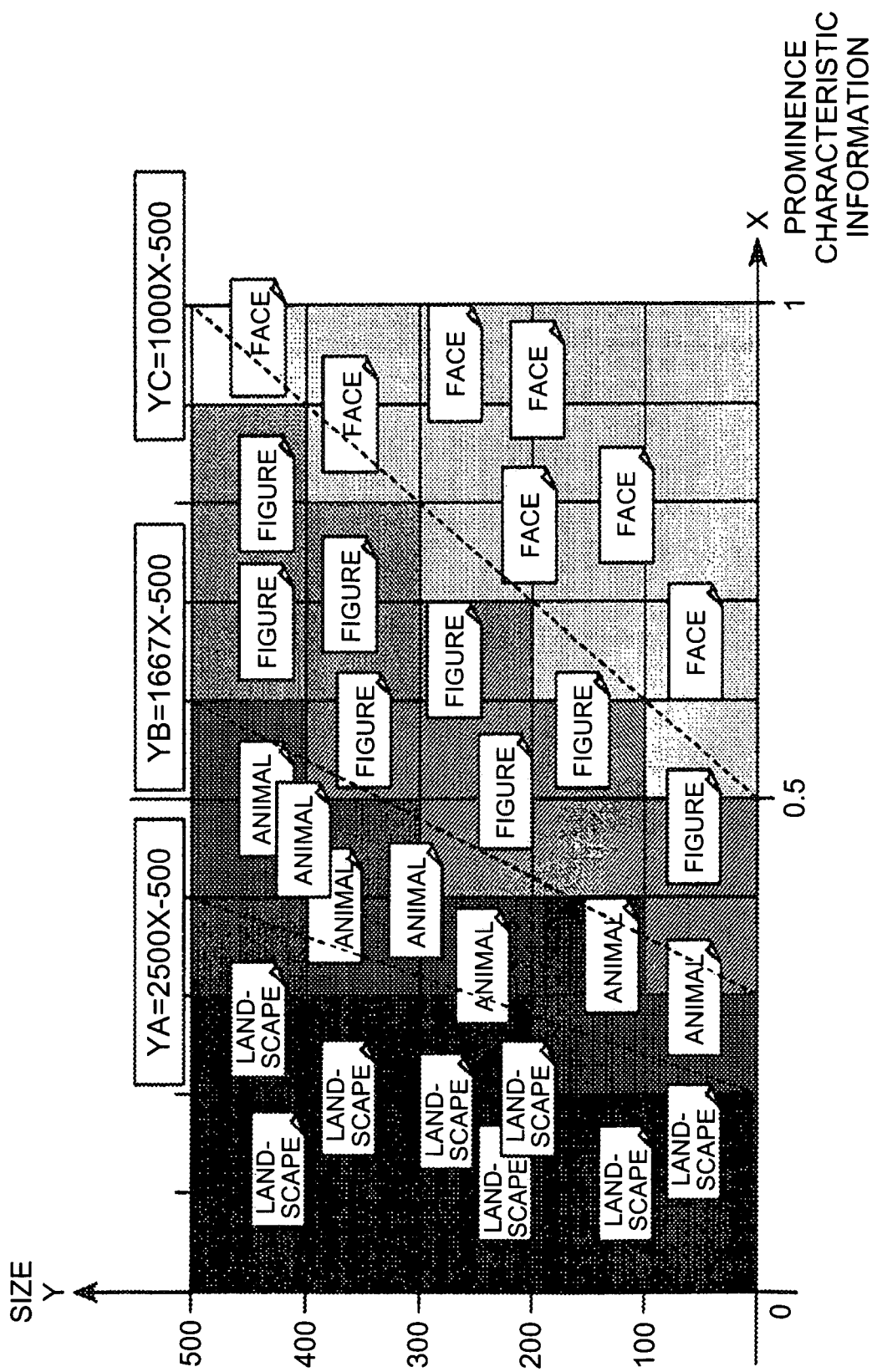
FIG. 4 illustrates a concept of a corresponding relation between categorical attribute, size and prominence characteristic information of an image.

FIG. 4 conceptually illustrates a corresponding relation between the categorical attribute, size and prominence characteristic information of an image.

An evaluation result obtained by the sensitive evaluation experimentation is conceptually shown in FIG. 4 in which the two-dimensional image characteristic information space is divided into sections of the respective categorical attributes by division lines to show a corresponding relation between the categorical attribute, the size and the prominence characteristic information. In the embodiment, an image characteristic information space is exemplified, which is a two-dimensional plane. The image characteristic information space may be in three or more dimensions in the case that any one of the categorical attribute, the size and the prominence characteristic information consists of multi-dimensional elements, for example. Further, the division line in FIG. 4 is not limited to a linear function but may be a quadratic or higher function or curve or the like. In the case that the image characteristic information space is in three or more dimensions, it is possible to express a border in a plane or a curved surface.

The characteristic information converting dictionary is formed on the basis of such sensitivity evaluation experimentation as described above.

Figure 5:
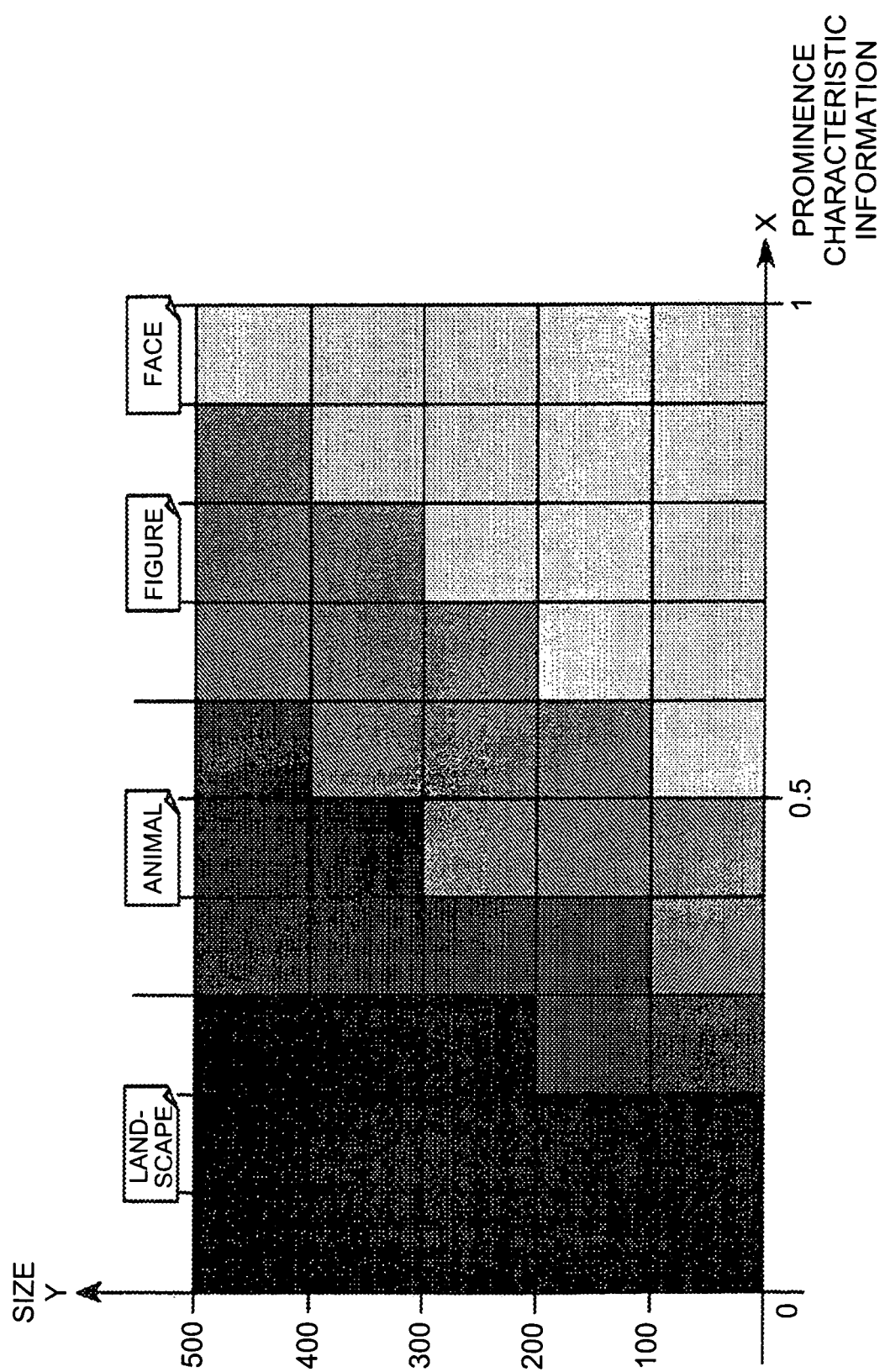
FIG. 5 illustrates a data structure of a characteristic information converting dictionary.

FIG. 5 illustrates a data structure of the characteristic information converting dictionary.

As shown in FIG. 5, the characteristic information converting dictionary is formed by forming a table F[Xmax][Ymax] capable of storing Xmax×Ymax units of data to store categorical attributes of respective coordinates in a table F[0 to Xmax−1][0 to Ymax−1] so that a two-dimensional matrix of a table F□□ would correspond to the image characteristic information space in FIG. 4.

For example, a table F[0][0] corresponds to an image, which is "0" both in size and prominence characteristic information, and contains "landscape" as the categorical attribute. A table F[Xmax−1][Ymax−1] corresponds to the image with the size of "500" and the prominence characteristic information of "1" and contains "face" as the categorical attribute.

On the other hand, returning to FIG. 2, the CPU 50 comprises a micro-processing unit or the like. The CPU 50 is arranged to start a predetermined program stored in a predetermined area of the ROM 52 to execute an image retrieval process shown in a flowchart in FIG. 6 in accordance with the program.

Figure 6:
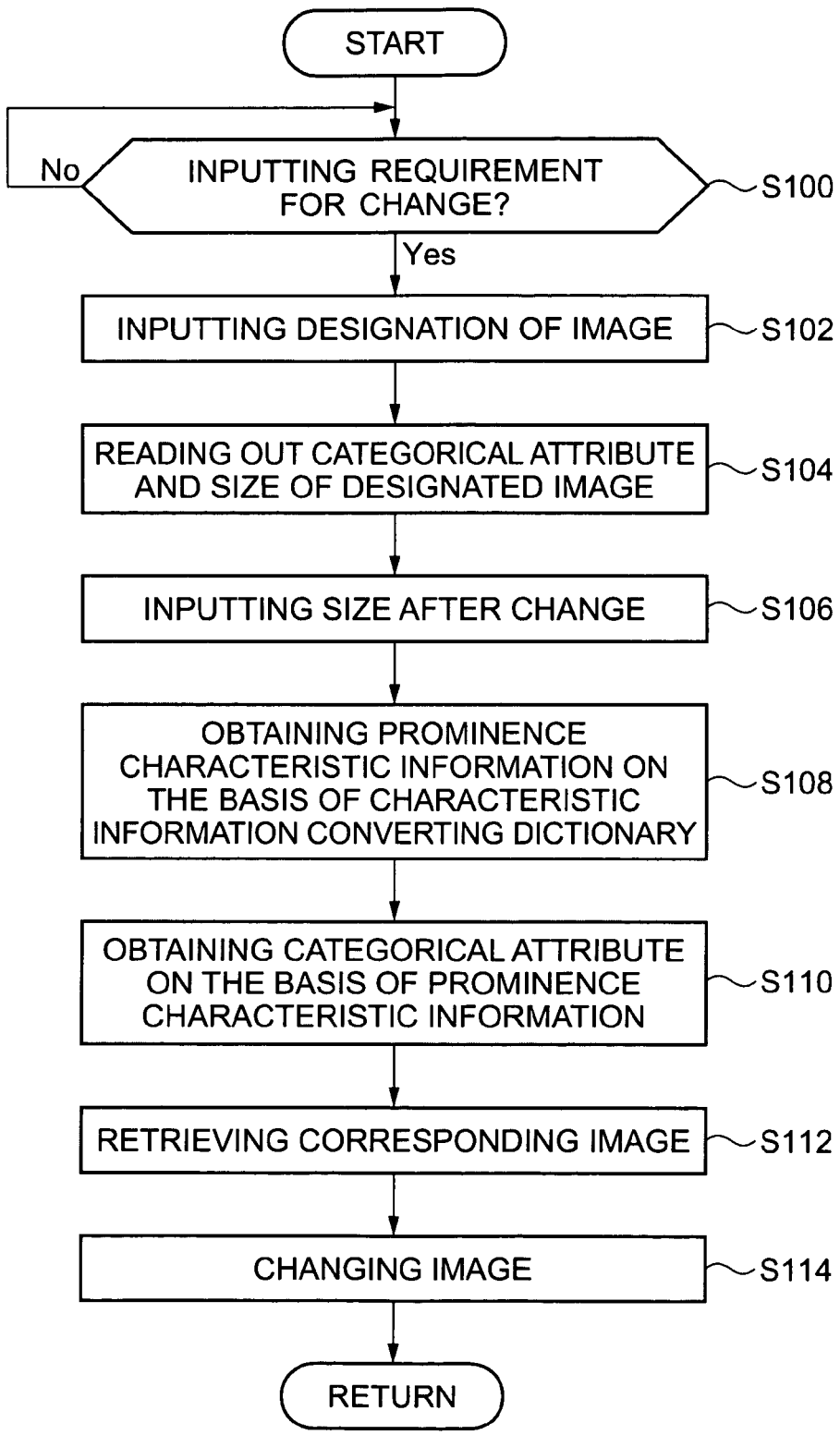
FIG. 6 is a flowchart of an image retrieval process.

FIG. 6 is a flowchart of an image retrieval process.

The image retrieval process is a process for changing an image arranged in a layout area into another image with different contents and size with the prominence of the former image being maintained in accordance with a request for change from the layout portion 14. It is arranged so that, when the CPU 50 executes the image retrieval process, the process first goes to Step S100, as shown in FIG. 6.

In Step 100, it is judged whether or not a request for change from the layout portion 14 is inputted. When the request for change is judged to be inputted (in the case of YES), the process goes to Step S102. When the reverse is judged (in the case of NO) it stands by in Step S100, however, until the request for change is inputted.

In Step S102, designation of an image subject to change among images arranged in the layout area is inputted by the inputting device 60 or the layout portion 14. The process then goes to Step S104 in which the categorical attribute and size corresponding to an image so designated (referred to as a designated image, hereinafter) are read from the image characteristic information registration table 400. Following the above, a size of an image after the change is inputted by the inputting device 60 or the layout portion 14 in Step S106.

In Step S108, prominence characteristic information is retrieved from the characteristic information converting dictionary on the basis of the read categorical attribute and size. First, the characteristic information converting dictionary in FIG. 5 is referred to so as to determine a range, which corresponds to the read size in the Y coordinate and to which a categorical attribute same as the read categorical attribute belongs in the X coordinate. The prominence characteristic information is obtained as a median in the determined range in the X coordinate, for example. When the categorical attribute is "animal" and the size is "400", for example, the range in the X coordinate is determined to be "0.3" to "0.5". The prominence characteristic information can be the median of the above, that is, "0.4".

Next, in Step S110, a categorical attribute is retrieved from the characteristic information converting dictionary on the basis of the prominence characteristic information obtained in Step S108 and the size after the change, which is inputted. First, the characteristic information converting dictionary in FIG. 5 is referred to so as to obtain the categorical attribute as a categorical attribute specified by the X coordinate corresponding to the obtained prominence characteristic information and the Y coordinate corresponding to the size after the change, which is inputted. When the prominence characteristic information is "0.4" and the size after the change is "500", for example, the categorical attribute is "animal".

The process then goes to Step S112 in which an image corresponding to the categorical attribute obtained in Step S110 and the size after the change, which is inputted, is retrieved from the image registration DB 10, in referring to the image characteristic information registration table 400. Then, in Step S114, the designated image is changed into a retrieved image to end a series of processes and return to an original process.

An operation of the embodiment will be described below with reference to FIGS. 7 to 9.

Figure 7:
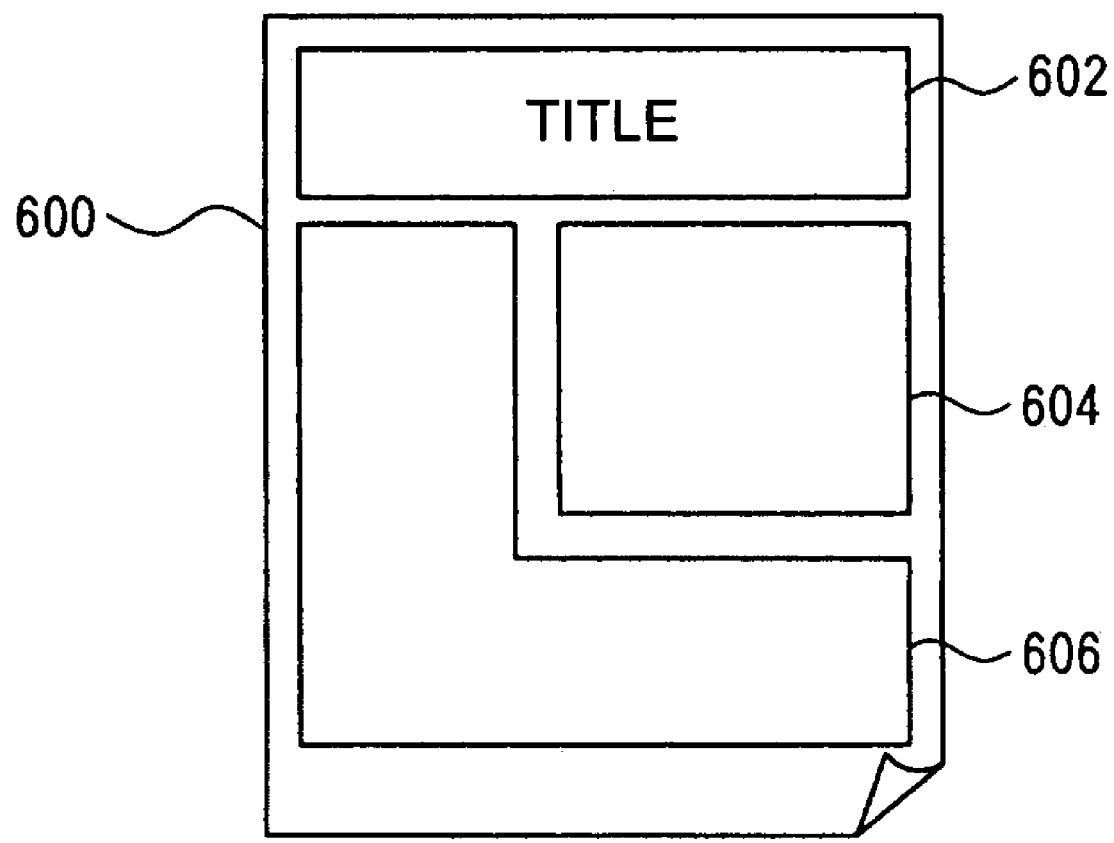
FIG. 7 illustrates a structure of a layout template used for layout.

FIG. 7 illustrates a structure of a layout template used for layout.

In the layout portion 14, a layout template is used for layout of an image in the image registration DB 10 or another layout element. As shown in FIG. 7, the layout template defines a layout in which an information storing frame or frames is or are arranged in the layout area. As the layout template, a layout defining file disclosed in Japanese Patent Application Publication 2002-297571 can be used, for example.

In an example in FIG. 7, a title storing frame 602 for storing a title, an image storing frame 604 for storing an image and a text storing frame 606 for storing a text are arranged in a layout area 600.

Figure 8:
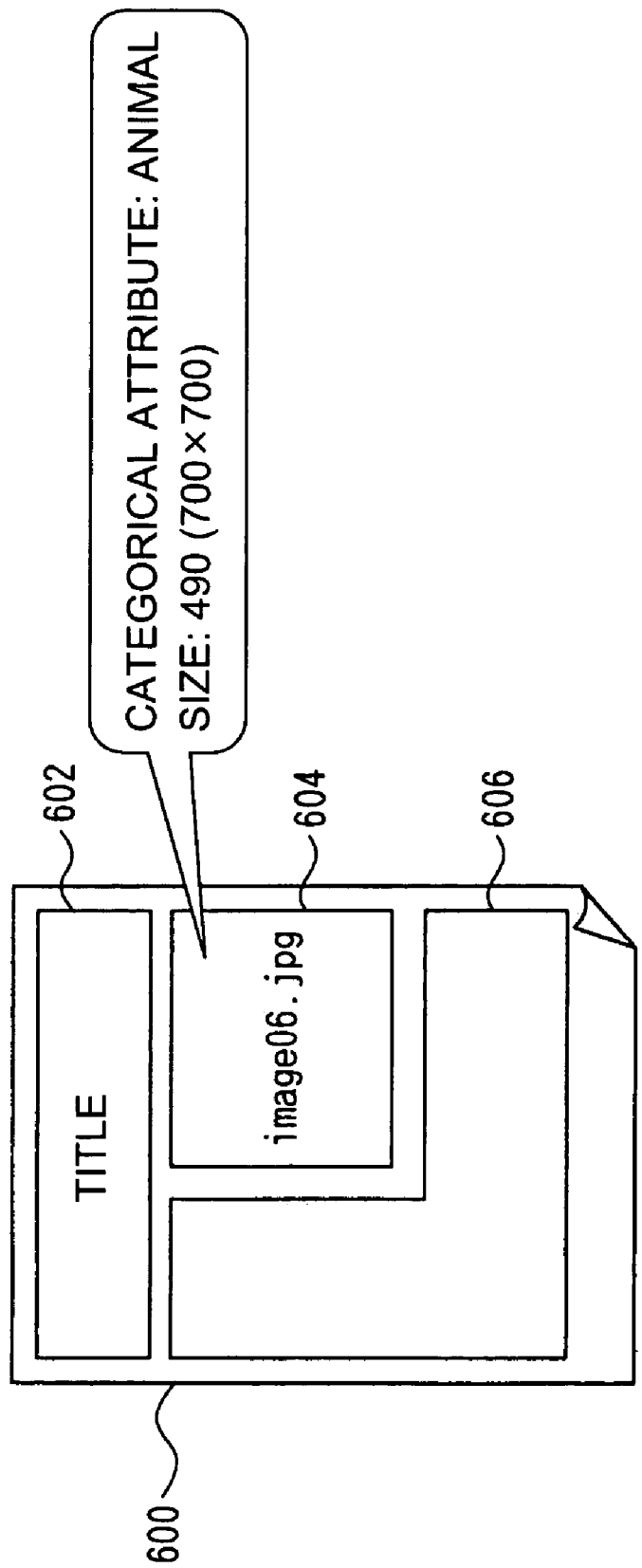
FIG. 8 illustrates an image stored in an image storing frame 604.

FIG. 8 illustrates an image stored in the image storing frame 604.

As shown in FIG. 8, a user first reads an image under the file name of "image06.jpg", for example, from the image registration DB 10 by the layout portion 14 to store the read image in the image storing frame 604. The image is of the categorical attribute of "animal" and the size of 490 kpixel.

The user then stores a certain text in the text storing frame 606 by the layout portion 14. The text to be stored, however, includes too many sentences to be stored in the text storing frame 606, so that the user increases a size of the text storing frame 606.

Figure 9:
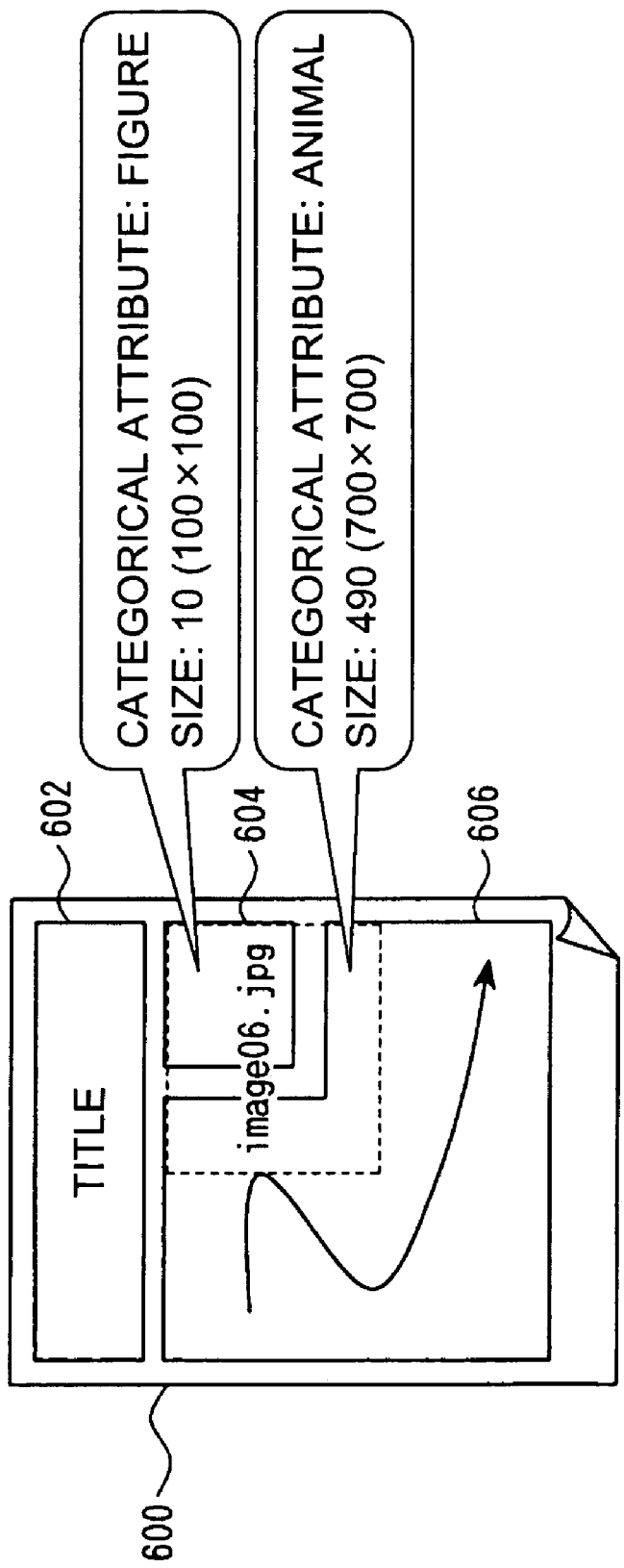
FIG. 9 illustrates a change in images in the image storing frame 604.

FIG. 9 illustrates a change in images in the image storing frame 604.

As shown in FIG. 9, in the above case, the image storing frame 604 is overlapped with the text storing frame 606. Accordingly, the user reduces the image storing frame 604 in size by the layout portion 14. This results in the image storing frame 604 of 10 kpixel in size, for example. When an image is scaled down, required prominence cannot be satisfied. Therefore, the user inputs a requirement for change so as to change the image under the file name of "image06.jpg" by the layout portion 14.

In the layout apparatus 100, designation of an image subject to change among images arranged in the layout area 600 is inputted in Step S102 when the requirement for change is inputted. In the above case, designation of the image under the file name of "image06.jpg" is inputted. After the image is designated, the categorical attribute and size corresponding to the designated image are read from the image characteristic information registration table 400 in Step S104.

Following the above, the size of the image after the change is inputted in Step S106. In the above case, inputted is 10 kpixel since the size of the image storing frame 604 is 10 kpixel.

Then, the prominence characteristic information is retrieved from the characteristic information converting dictionary on the basis of the read categorical attribute and size in Step S108. The categorical attribute of the designated image is "animal" while the size of the same is 490 kpixel. Accordingly, referring to the characteristic information converting dictionary in FIG. 5, a region in the X coordinate can be determined to be "0.3" to "0.6", and thereby, the prominence characteristic information can be a mediate thereof, namely, "0.45".

In Step S110, the categorical attribute is retrieved from the characteristic information converting dictionary on the basis of the obtained prominence characteristic information and the inputted size after the change. Referring to the characteristic information converting dictionary in FIG. 5, the categorical attribute is "figure" since the obtained prominence characteristic information is "0.45" and the inputted size after the change is "10".

Then, an image corresponding to the obtained categorical attribute and the inputted size after the change is retrieved from the image registration DB 10 in Step S112. Referring to the image characteristic information registration table 400 in FIG. 4, an image under the file name of "image02.jpg" corresponds to the obtained categorical attribute of "figure" and the inputted size after the change of "10", so that the image is retrieved. In the case that there is no corresponding image, an image corresponding to the categorical attribute and size most approximate to the obtained categorical attribute and the inputted size after the change is retrieved from the image registration DB 10.

The designated image is then changed into the retrieved image in Step S114. As a result, in the image storing frame 604, stored is an image under the file name of "image02.jpg" instead of the image under the file name of "image06.jpg", as shown in FIG. 9.

As described above, in the embodiment, it is arrange so that the categorical attribute and the size are inputted as the first retrieval key, the size after the change is inputted as the second retrieval key, the prominence characteristic information is obtained on the basis of the first retrieval key by the characteristic information converting portion 20, the categorical attribute is obtained on the basis of the obtained prominence characteristic information and the second retrieval key by the characteristic information converting portion 20 and an image matching the obtained categorical attribute and the second retrieval key is retrieved from the image registration DB 10.

This allows an image matching or approximate to the size after the change to be obtained with the prominence of the image being maintained. Accordingly, layout in accordance with the number or the amount of a layout element with required prominence being satisfied can obtained easier than the conventional case.

Further, in the embodiment, it is arrange so that, on the basis of the two pieces of given characteristic information, the rest of the characteristic information be retrieved from the characteristic information converting dictionary.

A corresponding relation between a categorical attribute, a size and prominence characteristic information is considered to be difficult to be defined by a relational expression since there is an element dependent to human subjectiveness. Accordingly, on the basis of the two pieces of given characteristic information, the rest characteristic information is more relatively properly obtained than the case of using a relational expression.

In the above embodiment, the image registration DB 10 corresponds to the retrieval subject image storing unit in Mode 1, 3, 6, 8, 11, 13, 16, 17 or 19. The CPU 50 corresponds to the arithmetic unit in Mode 17. The inputting device 60 corresponds to the inputting unit in Mode 17. The characteristic information converting dictionary registration DB 18 corresponds to the characteristic information converting dictionary storing unit in Mode 2. Further, the retrieval key inputting portion 22 and Steps S104 and S106 correspond to the retrieval key inputting unit in Mode 1 or 3 or the second retrieval key inputting unit in Mode 3. Steps S104 and S106 correspond to the retrieval key inputting step in Mode 6, 8, 11, 13, 16, 17 or 19 or the second retrieval key inputting step in Mode 8, 13 or 19.

Further, in the embodiment, the characteristic information converting portion 20 and Steps S108 and S110 correspond to the characteristic information converting unit in Modes 1 to 3. Steps S108 and S110 correspond to the characteristic information converting step in Modes 6 to 8, 11 to 13 and 16 to 19. The image retrieval portion 24 and Step S112 correspond to the image retrieval unit in Mode 1 or 3. Step S112 corresponds to the image retrieval step in Mode 6, 8, 11, 13, 16, 17 or 19. The categorical attribute corresponds to the semantic characteristic information in Mode 1, 2, 4 to 7, 9 to 12, 14 to 18, 20 or 21 or the first characteristic information in Mode 1, 3, 4, 6, 8, 9, 11, 13, 14, 16, 17, 19 or 20.

Moreover, in the embodiment, the size corresponds to the physical characteristic information in Mode 1, 2, 4 to 7, 9 to 12, 14 to 18, 20 or 21 or the second characteristic information in Mode 1, 3, 4, 6, 8, 9, 11, 13, 14, 16, 17, 19 or 20. The prominence characteristic information corresponds to the third characteristic information in Mode 1, 3, 4, 6, 8, 9, 11, 13, 14, 16, 17, 19 or 20.

The embodiment is arrange so that the categorical attribute and the size be inputted as the first retrieval key, the size after the change be inputted as the second retrieval key, the prominence characteristic information be obtained on the basis of the first retrieval key by the characteristic information converting portion 20, the categorical attribute be obtained on the basis of the obtained prominence characteristic information and the second retrieval key by the characteristic information converting portion 20 and an image matching the obtained categorical attribute and the second retrieval key be retrieved from the image registration DB 10. The invention, however, is not limited to the above. It is at least possible to propose the following eight structures.

In a first structure, images are registered in the image registration DB 10 so as to respectively correspond to the categorical attribute and the size, the categorical attribute and the size are inputted as the first retrieval key, the categorical attribute after the change is inputted as the second retrieval key, the prominence characteristic information is obtained by the characteristic information converting portion 20 on the basis of the first retrieval key, the size is obtained by the characteristic information converting portion 20 on the basis of the obtained prominence characteristic information and the second retrieval key and an image matching or approximate to the obtained size and the second retrieval key is retrieved from the image registration DB 10.

This allows an image matching or approximate to the categorical attribute after the change to be obtained with the prominence of an original image being maintained.

In a second structure, images are registered in the image registration DB 10 so as to respectively correspond to the categorical attribute and the prominence characteristic information, the categorical attribute and the prominence characteristic information are inputted as the first retrieval key, the categorical attribute after the change is inputted as the second retrieval key, the size is obtained by the characteristic information converting portion 20 on the basis of the first retrieval key, the prominence characteristic information is obtained by the characteristic information converting portion 20 on the basis of the obtained size and the second retrieval key and the image matching or approximate to the obtained prominence characteristic information and the second retrieval key is retrieved from the image registration DB 10.

This allows an image matching or approximate to the categorical attribute after the change to be obtained with the size of an original image being maintained. This is advantageous in the case that an eye-catching element is limited in size although there is a request for increasing the prominence as much as possible, for example.

In a third structure, images are registered in the image registration DB 10 so as to respectively correspond to the categorical attribute and the prominence characteristic information, the categorical attribute and the prominence characteristic information are inputted as the first retrieval key, the prominence characteristic information after the change is inputted as the second retrieval key, the size is obtained by the characteristic information converting portion 20 on the basis of the first retrieval key, the categorical attribute is obtained by the characteristic information converting portion 20 on the basis of the obtained size and the second retrieval key and an image matching or approximate to the obtained categorical attribute and the second retrieval key is retrieved from the image registration DB 10.

This allows an image matching or approximate to the prominence characteristic information after the change to be obtained with the size of an original image being maintained. This is advantageous in the case that an eye-catching element is limited in size although there is a request for increasing the prominence as much as possible, for example.

In a fourth structure, images are registered in the image registration DB 10 so as to respectively correspond to the size and the prominence characteristic information, the size and the prominence characteristic information are inputted as the first retrieval key, the size after the change is inputted as the second retrieval key, the categorical attribute is obtained by the characteristic information converting portion 20 on the basis of the first retrieval key, the prominence characteristic information is obtained by the characteristic information converting portion 20 on the basis of the obtained categorical attribute and the second retrieval key and an image matching or approximate to the obtained prominence characteristic information and the second retrieval key is retrieved from the image registration DB 10.

This allows an image matching or approximate to the size after the change to be obtained with the categorical attribute of an original image being maintained. This is advantageous in the case that an eye-catching element is limited in categorical attribute although there is a request for increasing the prominence as much as possible, for example.

In a fifth structure, images are registered in the image registration DB 10 so as to respectively correspond to the size and the prominence characteristic information, the size and the prominence characteristic information are inputted as the first retrieval key, the prominence characteristic information after the change is inputted as the second retrieval key, the categorical attribute is obtained by the characteristic information converting portion 20 on the basis of the first retrieval key, the size is obtained by the characteristic information converting portion 20 on the basis of the obtained categorical attribute and the second retrieval key and an image matching or approximate to the obtained size and the second retrieval key is retrieved from the image registration DB 10.

This allows an image matching or approximate to the prominence characteristic information after the change to be obtained with the categorical attribute of an original image being maintained. This is advantageous in the case that an eye-catching element is limited in categorical attribute although there is a request for increasing prominence as much as possible, for example.

In a sixth structure, images are registered in the image registration DB 10 so as to respectively correspond to the categorical attribute, the size and the prominence characteristic information, an image is inputted as the retrieval key, the prominence characteristic information of the retrieval key is calculated and an image matching or approximate to the calculated prominence characteristic information is retrieved from the image registration DB 10.

This allows an image different in categorical attribute or size from an original image to be obtained with the prominence of the original image being maintained.

In a seventh structure, images are registered in the image registration DB 10 so as to respectively correspond to the categorical attribute, the size and the prominence characteristic information, an image is inputted as the retrieval key, the categorical attribute of the retrieval key is inputted and an image matching or approximate to the inputted categorical attribute is retrieved from the image registration DB 10.

This allows an image different in size or prominence from an original image to be obtained with the categorical attribute of the original image being maintained.

In an eighth structure, images are registered in the image registration DB 10 so as to respectively correspond to the categorical attribute, the size and the prominence characteristic information, an image is inputted as the retrieval key, the size of the retrieval key is calculated and an image matching or approximate to the calculated size is retrieved from the image registration DB 10.

This allows an image different in categorical attribute or prominence from an original image to be obtained with the size of the original image being maintained.

The above embodiment is arranged so that the size after the change be inputted as the second retrieval key. The invention, however, is not limited to the above. It is possible to arrange no second retrieval key to be inputted. In this case, the prominence characteristic information is obtained on the basis of the categorical attribute and size inputted as the first retrieval key by the characteristic information converting portion 20, ranges of the categorical attribute and the size are determined on the basis of the obtained prominence characteristic information by the characteristic information converting portion 20 and an image belonging to or approximate to the determined ranges of the categorical attribute and the size is retrieved from the image registration DB 10, for example. Such arrangement can be applied similarly to the above first to fifth structures.

Further, in the embodiment, the image registration DB 10 and the characteristic information converting dictionary registration DB 18 are provided as external devices of the layout apparatus 100. The invention, however, is not limited to the above. The image registration DB 10 or the characteristic information converting dictionary registration DB 18 may be provided in any terminal on a network to connect the layout apparatus 100 with the terminal through a network so that the layout apparatus 100 would use the DB 10 or 18 of the terminal.

Moreover, the layout apparatus 100 is arranged to be formed in one body in the embodiment, but the invention is not limited to the above. It may be arranged to be formed as a network system in which plural devices are connected through a network. In the case that the layout apparatus 100 comprises a host terminal and a layout processing server, for example, the following structure may be proposed.

The host terminal includes an inputting portion 12 and transmits inputting information of the inputting portion 12 to the layout server.

The layout processing server includes an image registration DB 10, a layout portion 14, a printing portion 16, a characteristic information converting dictionary registration DB 18, a characteristic information converting portion 20, a retrieval key inputting portion 22 and an image retrieval portion 24. The layout processing server receives the inputting information from the host terminal to output the received inputting information to the layout portion 14.

In addition to the above, in the above embodiment, exemplified is a case that only one corresponding image is obtained in the retrieval. It is possible, however, when plural corresponding images are obtained or an approximate image other than the corresponding image is obtained in the retrieval, to arrange the obtained images to be displayed in a table for selection by a user so that the designated image would be changed into an image selected by the user.

Furthermore, in the embodiment, exemplified is a case of executing a controlling program stored in advance in the ROM 52 in executing a process of a flowchart shown in FIG.

6. The invention, however, is not limited to the above. It is possible to read a program showing the process into the RAM 54 from a storage medium in which the program is stored as shown in FIG. 10 to execute the program.

Figure 10:
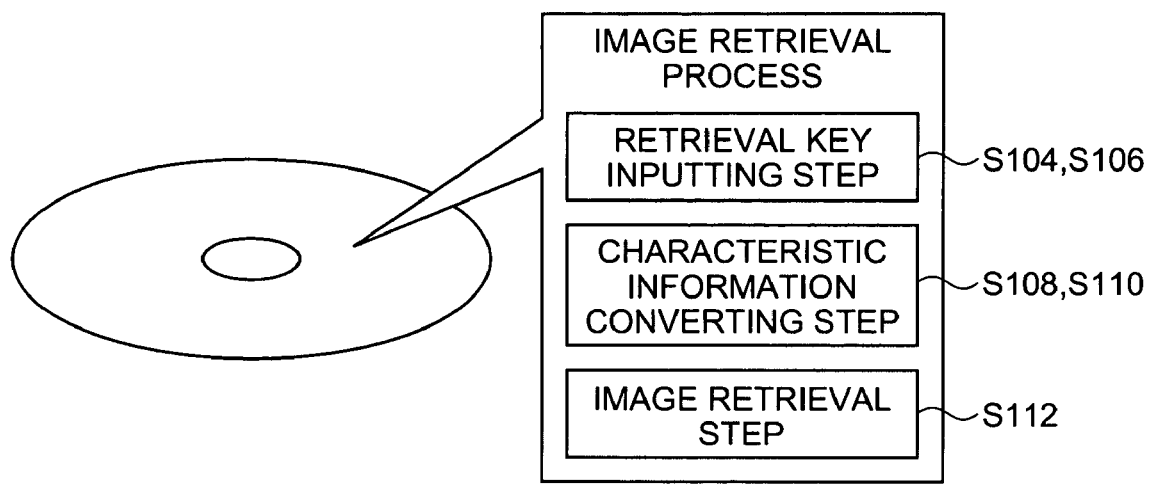
FIG. 10 illustrates a storage medium and a data structure thereof

FIG. 10 illustrates the storage medium and a data structure thereof.

In the above context, the storage medium means a semiconductor storage medium such as a RAM and a ROM, a magnetic storing type of storage medium such as an FD and an HD, an optical reading type of storage medium such as a CD, a CDV, an LD and a DVD or a magnetic storing/optical reading type of storage medium such as an MO. It includes any storage medium as long as the storage medium can be read by a computer regardless of a reading method such as an electronic, magnetic and optical reading methods.

In the above embodiment, the image retrieval system, the image retrieval program and storage medium and the image retrieval method in accordance with the invention are applied to the case that an image arranged in the layout area is changed into another image different in contents or size with the prominence of the former image being maintained in a layout operation of arranging a layout element such as an image and a text in a predetermined layout area. The invention, however, is not limited to the above. The image retrieval system, the image retrieval program and storage medium and the image retrieval method in accordance with the invention may be applied to other cases within a range not deviating from the spirit of the invention.

What is claimed is:

1. An image retrieval system for retrieving an image corresponding to a retrieval key among plural images subject to retrieval based on the retrieval key, the image retrieval system comprising:
    a retrieval subject image storing unit that stores the images subject to retrieval so that respective images correspond to first characteristic information and second characteristic information among semantic characteristic information corresponding to a categorical attribute given in accordance with contents of an image, physical characteristic information relating to at least one of a size of an image and an arrangement of colors in an image and prominence characteristic information showing prominence of an image;
    a retrieval key inputting unit that inputs the first characteristic information and the second characteristic information as the retrieval key;
    a characteristic information converting dictionary storing unit that stores a characteristic information converting dictionary defining a corresponding relation between the semantic characteristic information, the physical characteristic information and the prominence characteristic information;
    a characteristic information converting unit that obtains a remainder of the characteristic information other than any two of the semantic characteristic information, the physical characteristic information and the prominence characteristic information based on the two of the semantic characteristic information, the physical characteristic information and the prominence characteristic information, and that retrieves the remainder of the characteristic information from the characteristic information converting dictionary based on the given two pieces of characteristic information; and
    an image retrieval unit that retrieves an image subject to retrieval, the image at least being approximate to third characteristic information other than the first characteristic information and the second characteristic information among the semantic characteristic information, the physical characteristic information and the prominence characteristic information, from the retrieval subject image storing unit by the characteristic information converting unit based on the first characteristic information and the second characteristic information, which are inputted by the retrieval key inputting unit.

2. The image retrieval system according to claim 1, comprising:
    a second retrieval key inputting unit that inputs at least one of the first characteristic information and the second characteristic information as the second characteristic information of the retrieval key, wherein
    the image retrieval unit is arranged so that: the third characteristic information is obtained by the characteristic information converting unit based on the first characteristic information and the second characteristic information, which are inputted by the retrieval key inputting unit; at least one of the first characteristic information and the second characteristic information is obtained by the characteristic information converting unit based on the obtained third characteristic information and the first characteristic information and the second characteristic information, which are inputted by the second retrieval key inputting unit; and an image subject to retrieval, the image at least being approximate to at least one of the obtained second characteristic information and first characteristic information and the first characteristic information and the second characteristic information, which is inputted by the second retrieval key inputting unit, is retrieved from the retrieval subject image storing unit.

3. The image retrieval system according to claim 1, wherein
    the first characteristic information and the second characteristic information are the semantic characteristic information and the physical characteristic information; and
    the third characteristic information comprises the prominence characteristic information.

4. A computer-readable medium storing an image retrieval program for retrieving an image corresponding to a retrieval key among plural images subject to retrieval based on the retrieval key, the image retrieval program being a program causing a computer to execute a process comprising:
    a retrieval key inputting step for inputting as the retrieval key first characteristic information and second characteristic information among semantic characteristic information corresponding to a categorical attribute given in accordance with contents of an image, physical characteristic information relating to at least one of a size of an image and an arrangement of colors in an image, and prominence characteristic information showing prominence of an image;
    a characteristic information converting step for obtaining a remainder of the characteristic information other than any two of the semantic characteristic information, the physical characteristic information and the prominence characteristic information based on the two of the semantic characteristic information, the physical characteristic information and the prominence characteristic information, by retrieving the remainder of the characteristic information from a characteristic information converting dictionary based on the given two pieces of characteristic information, the characteristic information converting dictionary defining a corresponding relation between the semantic characteristic information, the physical characteristic information and the prominence characteristic information; and an image retrieval step for carrying out the characteristic information converting step based on the first characteristic information and the second characteristic information, which are inputted in the retrieval key inputting step, to retrieve an image subject to retrieval, the image at least being approximate to third characteristic information other than the first characteristic information and the second characteristic information among the semantic characteristic information, the physical characteristic information and the prominence characteristic information, from a retrieval subject image storing unit stored with respective images subject to retrieval, the images corresponding to the first characteristic information and the second characteristic information.

5. An image retrieval method for retrieving an image corresponding to a retrieval key among plural images subject to retrieval based on the retrieval key, comprising:

a retrieval key inputting step for inputting as the retrieval key first characteristic information and second characteristic information among semantic characteristic information corresponding to a categorical attribute given in accordance with contents of an image, physical characteristic information relating to at least one of a size of an image and an arrangement of colors in an image, and prominence characteristic information showing prominence of an image;

a characteristic information converting step for obtaining a remainder of the characteristic information other than any two of the semantic characteristic information, the physical characteristic information and the prominence characteristic information based on the two of the semantic characteristic information, the physical characteristic information and the prominence characteristic information, by retrieving the remainder of the characteristic information from a characteristic information converting dictionary based on the given two pieces of characteristic information, the characteristic information converting dictionary defining a corresponding relation between the semantic characteristic information, the physical characteristic information and the prominence characteristic information; and an image retrieval step for carrying out the characteristic information converting step based on the first characteristic information and the second characteristic information, which are inputted in the retrieval key inputting step, to retrieve an image subject to retrieval, the image at least being approximate to third characteristic information other than the first characteristic information and the second characteristic information among the semantic characteristic information, the physical characteristic information and the prominence characteristic information, from a retrieval subject image storing unit stored with respective images subject to retrieval, the images corresponding to the first characteristic information and the second characteristic information.

6. An image retrieval method for retrieving an image corresponding to a retrieval key among plural images subject to retrieval based on the retrieval key, comprising:

a retrieval key inputting step in which an inputting unit inputs as the retrieval key first characteristic information and second characteristic information among semantic characteristic information corresponding to a categorical attribute given in accordance with contents of an image, physical characteristic information relating to at least one of a size of an image and the arrangement of colors in an image, and prominence characteristic information showing prominence of an image;

a characteristic information converting step in which an arithmetic unit obtains a remainder of the characteristic information other than any two of the semantic characteristic information, the physical characteristic information and the prominence characteristic information based on the two of the semantic characteristic information, the physical characteristic information and the prominence characteristic information, by retrieving the remainder of the characteristic information from a characteristic information converting dictionary based on the given two pieces of characteristic information, the characteristic information converting dictionary defining a corresponding relation between the semantic characteristic information, the physical characteristic information and the prominence characteristic information; and an image retrieval step in which the arithmetic unit carries out the characteristic information converting step based on the first characteristic information and the second characteristic information, which are inputted in the retrieval key inputting step, to retrieve an image subject to retrieval at least being approximate to third characteristic information other than the first characteristic information and the second characteristic information among the semantic characteristic information, the physical characteristic information and the prominence characteristic information, from a retrieval subject image storing unit stored with respective images subject to retrieval, the images corresponding to the first characteristic information and the second characteristic information.

* * * * *